Patented May 11, 1943

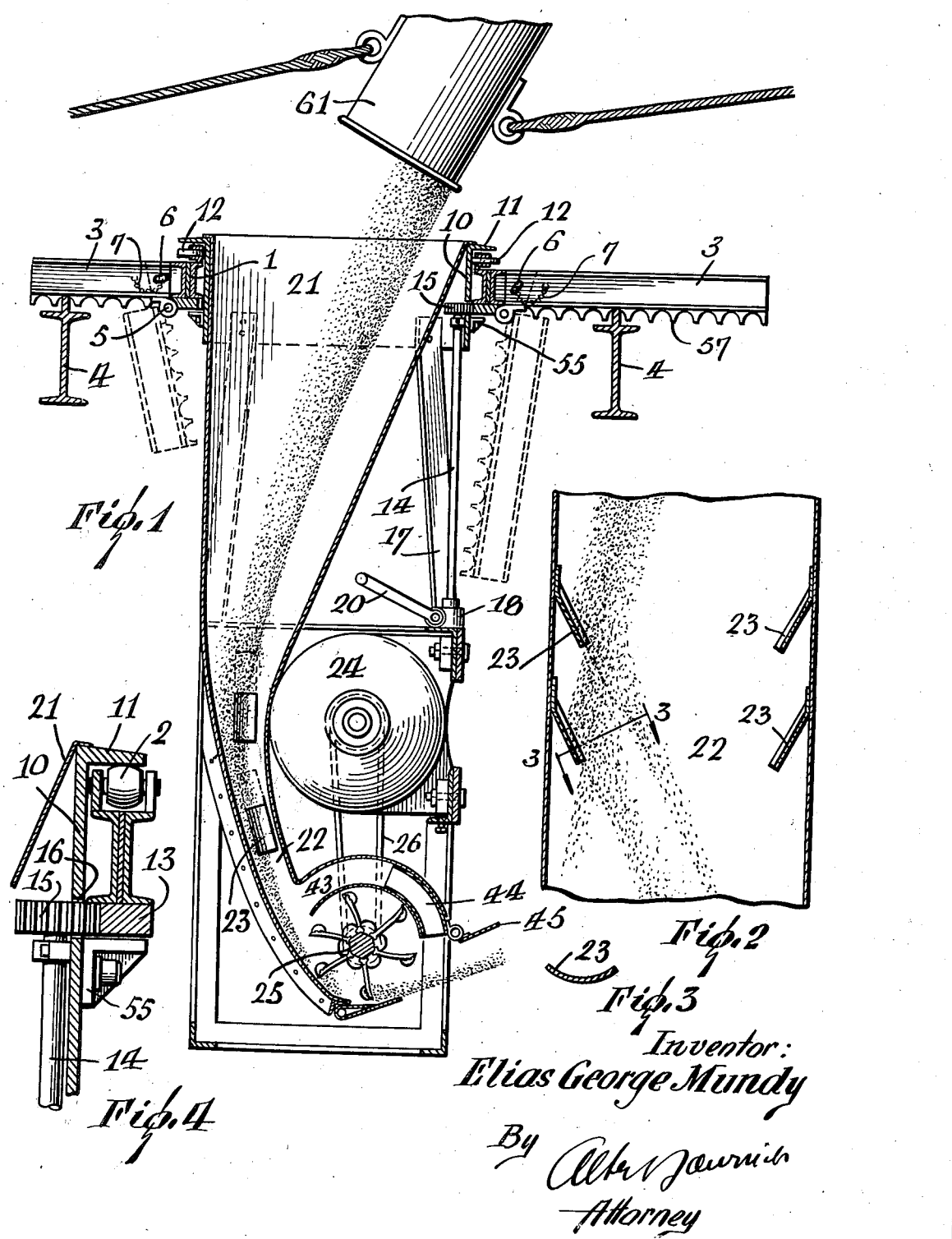

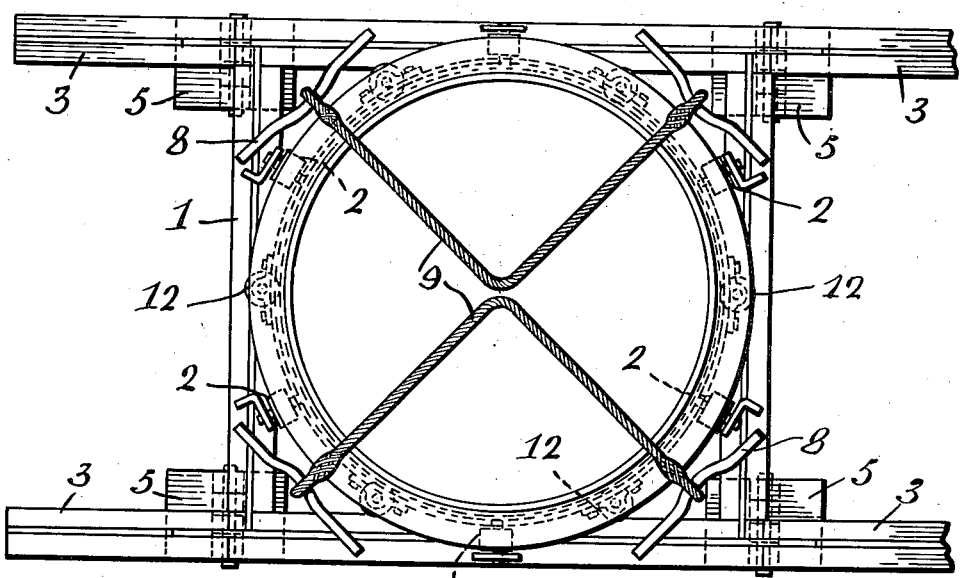
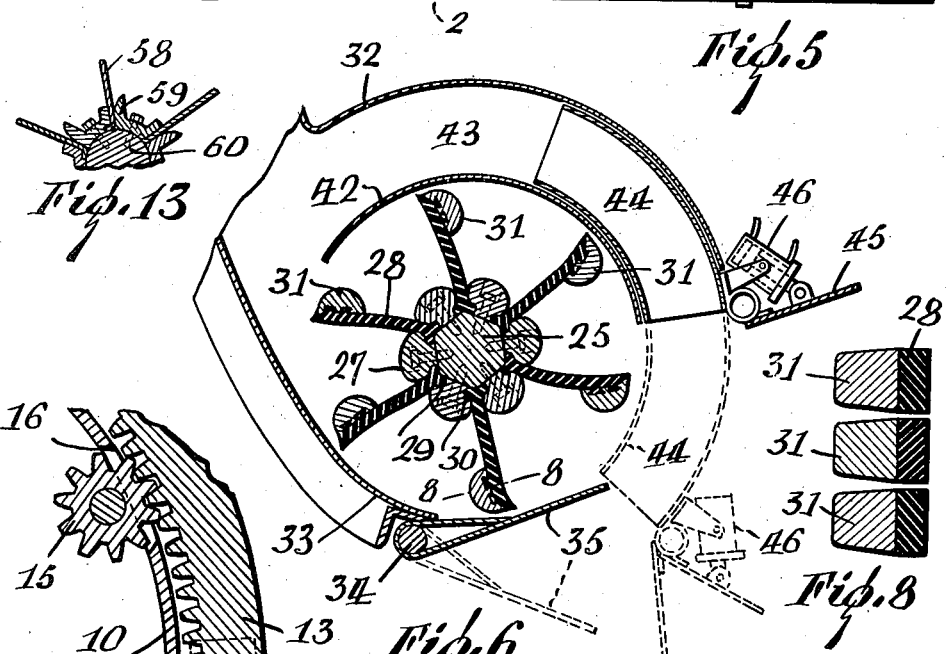
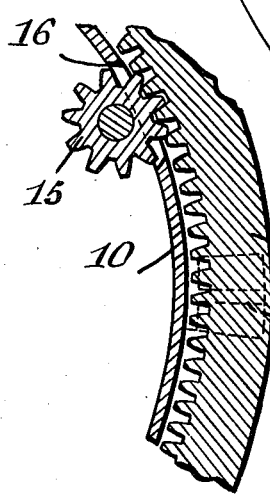

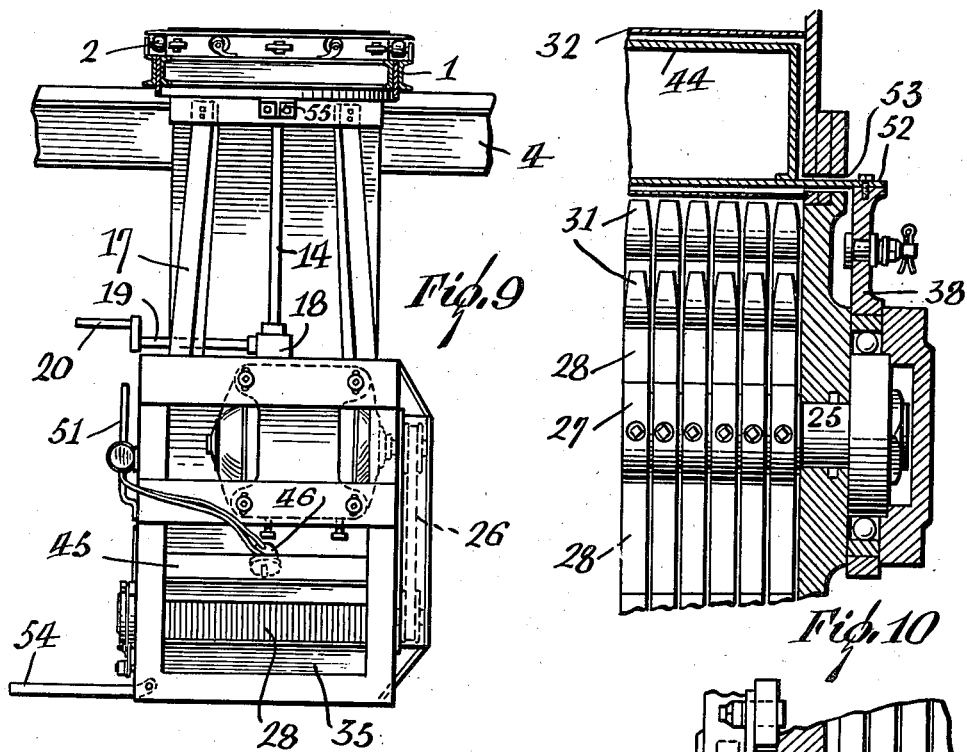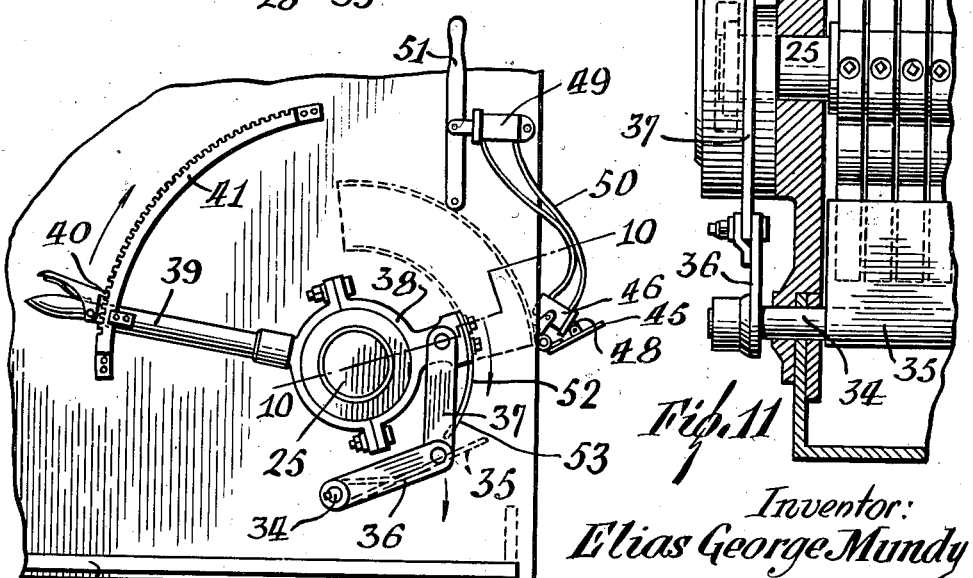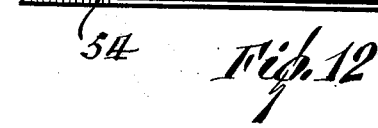

2,318,881

UNITED STATES PATENT OFFICE 2,318,881

GRAIN TRIMMING DEVICE

Elias George Mundy, New York, N. Y., assignor to Mundy Grain Trimmers Patents Ltd., Montreal, Quebec, Canada Application August 13, 1941, Serial No. 406,666 In Canada April 5, 1941

13 Claims. (Cl. 198—128)

The present invention pertains to a novel apparatus for the operation known as trimming grain and the like loaded into marine vessels.

A trimming device as known in the art extends into the hold of the vessel through one of the hatches and receives the material from the elevator spout. Its purpose is to throw the material laterally a sufficient distance to fill the more remote parts of the hold and to direct the material at the proper angle laterally and vertically for clearing any intervening obstacles.

Ordinarily the trimmer is allowed to rest directly on the material in the hold. It has been found that this arrangement presents certain dangers, inasmuch as the outlet of the trimmer may become obstructed by accmulating material. Also, the trimmer must be raised from time to time so that it will not be buried.

The principal object of the present invention is to overcome these difficulties and also to effect other improvements in the trimmer. With regard to the matter of support, the invention provides an apparatus whereby the trimmer is suspended from the hatch beams and need not rest upon the material in the hold. The trimmer has a roller mounting in its suspension support, whereby its outlet is easily and readily directed wherever desired.

As for other improvements, the invention provides an arrangement to prevent blocking of the trimmer, an arrangement for venting back drafts and other obstructing forces, upper and lower directions vanes at the outlet, and finally a novel construction of impeller, all of which is hereinafter described.

This invention is fully disclosed by way of example in the following description and in the accompanying drawings in which:

Figure 1 is a vertical section of the complete device;

Figure 2 is a detail vertical section at right angles to Figure 1;

Figure 3 is a section on the line 3—3 of Figure 2;

Figure 4 is an enlarged detail of Figure 1, illustrating the upper portion of the device;

Figure 5 is a plan view;

Figure 6 is an enlarged detail of Figure 1, illustrating the impeller;

Figure 7 is a detail plan section;

Figure 8 is the section on the line 8—8 of Figure 6;

Figure 9 is a side elevation at right angles to Figure 1;

Figure 10 is a vertical section on the line 10—10 of Figure 12;

Figure 11 is another vertical section;

Figure 12 is a detail vertical elevation illustrating the lower portion of the device, and Figure 13 is a modification of the vane assembly shown in Figure 6.

Reference to these views will now be made by use of like characters which are employed to designate corresponding parts throughout.

In Figures 1, 4 and 5 is shown a rectangular hanger frame 1 preferably made up of channels. At suitable points on the frame are journalled a number of rollers 2 on horizontal axes and forming a circular series for a purpose that will presently appear. Arms 3 extend from the frame 1 laterally and in opposite directions for the purpose of suspending the frame from the hatch beams 4 of a cargo vessel. The arms 3 are hinged to the frame structure at 5 and are dropped, as shown in dotted lines in Figure 1, in transporting the apparatus from place to place. The arms are locked in the extended horizontal position by fingers 6 held by chains 7 and adapted each to pass through an arm and through adjacent parts of the frame structure. Cleats 8 are welded across the corners of the frame 1 for attaching steel cable slings 9 by which the machine is hoisted aboard and off ship.

A cast aluminum cylinder 10 about 30" in diameter is fitted within the circle formed by the rollers 2. At its upper end, the cylinder has an outwardly extending flange 11 riding on the rollers 2, as shown more fully in Figure 4. Guide rollers 12 (Fig. 5) are carried by the frame 1 and engage the cylinder laterally to reduce the friction.

A circular rack 13 (Fig. 7) with internal teeth is secured to the frame 1 and surrounds the cylinder 10. A vertical shaft 14 carries at its upper end a pinion 15 meshing with the rack through a slot 16 in the cylinder. A suitable frame structure 17 (Fig. 9) is suspended from the aluminium casting 10 and supports a gear box 18 receiving the lower end of shaft 14. From the gear box extends a horizontal shaft 19 carrying at its outer end a hand crank 20, whereby the ring gear 13 is turned on its axis for a purpose that will presently appear. The crank may be hinged to fold up vertically in order to reduce the lateral projection in moving the apparatus about.

A hopper 21 is suspended from the cylinder 10 and converges into a flattened lower end or throat 22, as shown in Figure 1, for the purpose of shaping the material into a flat stream. At the end walls of the throat are mounted vanes 23 sloping inwardly and downwardly to prevent the material from piling up on either side, inasmuch as the entire width of the throat is not filled, as may be seen in Figure 2.

On the sub-frame structure 17 and adjacent to the upper part of the throat 22 is mounted a suitable motor 24. At the bottom of the hopper 21 is journalled an impeller shaft 25 geared to the motor at 26.

Special aluminum castings 27 (Fig. 6) are adapted to be mounted lengthwise on the surface of the shaft 25 in slightly spaced relation. The impeller blades 28 are positioned to lie between the subsequently assembled castings and have their lower edges spread at 29 to extend into undercut grooves 30 in the castings, whereby they are secured in proper position. The blades 28 are of rubber, and along the upper edge of each is vulcanized a metal strip 31 functioning as a weight in a manner that will presently be described.

One of the lateral walls of the throat 22 is continued from its lower end in the form of an arch 32 above the impeller blades at some distance therefrom and concentric with the shaft 25. The opposite lateral wall of the throat is extended downwardly a short distance close to the lower impeller blades. At the lower extremity of the portion 33 is journalled a shaft 34 parallel to the shaft 25 and carrying a vane 35 extending into the outlet of the hopper, for giving direction to the discharged material as will presently appear. A link 36 (Fig. 12) is secured to the shaft 34 and attaches to another link 37 which in turn is pivotally connected to a collar 38 rotatably mounted about the shaft 25, as shown more clearly in Figure 10. A lever 39 extends from the collar and carries a dog 40 which locks in adjusted positions on a curved rack 41 mounted on the sub-frame structure. By this means the position of the vane 35 is set.

A curved plate 42 is mounted close to the upper impeller blades 28 (Fig. 6) and forms with the portion 32 a channel 43 constituting a dust and air vent. It will be seen that the plate 42 does not obstruct the throat and leaves a comparatively wide outlet for the impeller by its spacing from the vane 35. In the space between the parts 32 and 42 is adjustably mounted a correspondingly shaped telescopic vent 44 to which is pivotally attached a deflecting vane 45.

A cylinder 46 with double acting piston is mounted on the member 44 along the vane 45. Rods 48 extend respectively from the pistons and are attached to the vane. The frame structure carries a power cylinder 49 (Fig. 12) piped at 50 to both ends of the cylinder 46, and the power cylinder is operated by a lever 51, whereby the vane 45 is adjusted.

To the collar 38 is secured a curved plate 52 (Figs. 10, 12) passing through a slot 53 in the housing structure and attached to the telescopic vent 44, whereby the latter is adjusted simultaneously with the vane 35 from the lever 39. The operator stands on a folding platform 54 (Fig. 9) from which he has access to the crank 20 and lever 51.

Brackets 55 (Fig. 4) are secured around the cylinder 10 and beneath the rack 13 to serve as a suspending means in lieu of the hatch beams 4 when the device is not suspended by the latter. It will also be seen in Figure 1 that the lower edges of the arms 3 are notched at 57 to prevent slipping on the beams.

In the modifications shown in Figure 13, the impeller blades 58 are of spring metal which may be laminated, or of other suitable resilient material. The blades are held by means of blocks 59 suitably secured to the shaft 60.

In the operation of the device, which has been suspended on the hatch beams 4 as described, the elevator spout 61 (Fig. 1) is swung over the hopper 21 to charge it with material such as grain, for example. Because of the mounting of the apparatus on the rollers 2, the trimmer is rotatable on its axis through a complete circle to direct the outlet of the hopper wherever desired. Also, the hinged mounting of the arms 3 permits the machine to be lowered without removing the hatch beams of upper decks when trimming in the lower holds.

Prior devices for trimming have been set directly on the material in the hold, and it has been found that said dangers result from this practice. In the present invention the apparatus is suspended from an upper support and is positioned well above the material so that the dangers are eliminated. The material is spread out in a flat stream by the throat as previously described before entering the impeller, and discharged from the impeller in a direction lateral to the hopper, as illustrated in Figure 1.

The rubber blades 28 are flexible, and the metal bars 31 are so arranged thereon as to bring the line of centrifugal force rearward of each blade. The results of this construction are: 1. The blade is prevented from taking a permanent set or lag. 2. The centrifugal force holds the blade up to its work. 3. The flexing movement of the blade has a kinetic energy that provides a striking force to start the acceleration of the material, and centrifugal force holds the blade without lag. 4. If any foreign material such as pieces of board or metal or other hard substance come through with the grain, the blades will bend and permit the foreign matter to pass through without breaking any of the parts and, because of the weights 31, the blades will assume their proper position when the foreign substance has passed. 5. The rubber blade presents a resilient surface to grain and thereby further reduces the liability of damaging the grain.

The vane 35, elevated or depressed in the manner described, gives the material the proper trajectory for distance, clearing the beams and completely filling the holds. The vane 45 carried by the telescoping vent 44 is adjusted to cross the path of the discharging material to any desired degree, thereby spreading the material into a thin and wide stream. This vane is used principally for leveling.

The dust and air vent 43 relieves obstructing pressure built up in the impeller. The down draft caused by the grain and the back draft caused by the impeller blades ordinarily must escape upwardly through the hopper. In such case the flow of the material is retarded and the dust obscures the mouth of the hopper. The vent 43, communicating at one end with the hopper, by-passes the air and the dust through the vent 44 to the discharge end of the impeller and into the outflowing material. The removal of the obstructing drafts in this manner permits the discharged material to be thrown a greater distance. Since the upper deflecting vane 45 is carried by the telescoping vent 44, the by-passed air and dust are always delivered close to the outgoing material.

When the grain is thrown into the hopper at a sharp angle, the vanes 23 at only one end of the throat are effective, as shown in Figure 2. Nevertheless, the vanes prevent the material from crowding into a restricted part of the hopper and blocking the machine, which would otherwise occur if the vanes were not present. Also, it will be seen in Figure 1 that the vanes 23 are spaced from the rear or bottom of wall of the hopper. The material flowing through this space tends to reduce obstruction, while the remainder of the material is deflected by the vanes as already described.

In addition to trimming material loaded into vessels, the apparatus or suitable modifications thereof can be used for sanding roads and sidewalks, putting out fires caused by incendiary bombs or other causes, spreading concrete in road work and in the erection of buildings, and handling any granular material.

Although specific embodiments of the invention have been illustrated and described, it will be understood that various alterations in the details of construction may be made without departing from the scope of the invention as indicated by the appended claims.

What I claim is:

1. In a trimmer, a hopper, a bladed impeller in the lower end thereof, said hopper having one of its walls extended as an arch over said impeller, a concentric plate between said arch and the impeller blades, said arch and plate forming a vent communicating with the hopper, said hopper having an outlet at the discharge side of said impeller and with which said vent also communicates.

2. In a trimmer, a hopper having opposite lateral walls converging to form a flattened lower throat portion and having end walls between said lateral walls, downwardly sloping fins carried by said end walls, a bladed impeller in the lower end of said hopper, said hopper having one of its walls extended as an arch over said impeller, a concentric plate between said arch and the impeller blades, said arch and plate forming a vent communicating with the hopper, said hopper having an outlet at the discharge side of said impeller and with which said vent also communicates.

3. In a trimmer, a hopper, a bladed impeller in the lower end thereof, said hopper having one of its walls extended as an arch over said impeller, a concentric plate between said arch and the impeller blades, said arch and plate forming a vent communicating with the hopper, said hopper having an outlet at the discharge side of said impeller and with which said vent also communicates, and a telescopically mounted vent tube in said vent and exposed at said outlet.

4. In a trimmer, a hopper having opposite lateral walls converging to form a flattened lower throat portion and having end walls between said lateral walls, downwardly sloping fins carried by said end walls, a bladed impeller in the lower end of said hopper, said hopper having one of its walls extended as an arch over said impeller, a concentric plate between said arch and the impeller blades, said arch and plate forming the vent communciating with the hopper, said hopper having an outlet at the discharge side of said impeller and with which said vent also communicates, and a telescopically mounted vent tube in said vent and exposed at said outlet.

5. In a trimmer, a hopper, a bladed impeller in the lower end thereof, said hopper having one of its walls extended as an arch over said impeller, a concentric plate between said arch and the impeller blades, said arch and plate forming a vent communicating with the hopper, said hopper having an outlet at the discharge side of said impeller and with which said vent also communicates, and a directing vane adjustably hinged on the opposite wall of said hopper and extending into said outlet beneath said impeller.

6. In a trimmer, a hopper, a bladed impeller in the lower end thereof, said hopper having one of its walls extended as an arch over said impeller, a concentric plate between said arch and the impeller blades, said arch and plate forming a vent communicating with the hopper, said hopper having an outlet at the discharge side of said impeller and with which said vent also communicates, a telescopically mounted vent tube in said vent and exposed at said outlet, and a directing vane adjustably hinged on the opposite wall of said hopper and extending into said outlet beneath said impeller.

7. In a trimmer, a hopper, a blade impeller in the lower end thereof, said hopper having one of its walls extended as an arch over said impeller, a concentric plate between said arch and the impeller blades, said arch and plate forming a vent communicating with the hopper, said hopper having an outlet at the discharge side of said impeller and with which said vent also communicates, a telescopically mounted vent tube in said vent and exposed at said outlet, a directing vane adjustably hinged on the opposite wall of said hopper and extending into said outlet beneath said impeller, and another vane hingedly mounted on said vent tube.

8. In a trimmer, a hopper, a bladed impeller in the lower end thereof, said hopper having one of its walls extended as an arch over said impeller, a concentric plate between said arch and the impeller blades, said arch and plate forming a vent communicating with the hopper, said hopper having an outlet at the discharge side of said impeller and with which said vent also communicates, a telescopically mounted vent tube in said vent and exposed at said outlet, a directing vane adjustably hinged on the opposite wall of said hopper and extending into said outlet beneath said impeller, and a common adjusting means for said vent tube and directing vane.

9. In a trimmer, a hopper, an impeller shaft in the discharge end of said hopper, flexible blades having widened edges engaging said shaft, and undercut blocks secured to said shaft between said blades and receiving said widened edges.

10. In a trimmer, a hopper, an impeller shaft in the discharge end of said hopper, flexible blades having widened edges engaging said shaft, undercut blocks secured to said shaft between said blades and receiving said widened edges, and a weight carried by the free edge of each blade on the trailing side thereof.

11. In a trimmer, a frame, means for supporting said frame in an elevated position, a hopper, a bladed impeller in the lower end thereof, said hopper having one of its walls extended as an arch over said impeller, a concentric plate between said arch and the impeller blades, said arch and plate forming a vent communicating with the hopper, said hopper having an outlet at the discharge side of said impeller and with which said vent also communicates.

12. In a trimmer, a frame, means for supporting said frame in an elevated position, a hopper, a bladed impeller in the lower end thereof, said hopper having one of its walls extended as an arch over said impeller, a concentric plate between said arch and the impeller blades, said arch and plate forming a vent communicating with the hopper, said hopper having an outlet at the discharge side of said impeller and with which said vent also communicates, and a telescopically mounted vent tube in said vent and exposed at said outlet.

13. In a trimmer, a frame. means for supporting said frame in an elevated position, a hopper, a bladed impeller in the lower end thereof, said hopper having one of its walls extended as an arch over said impeller, a concentric plate between said arch and the impeller blades, said arch and plate forming a vent communicating with the hopper, said hopper having an outlet at the discharge side of said impeller and with which said vent also communicates, a telescopically mounted vent tube in said vent and exposed at said outlet, a directing vane adjustably hinged on the opposite wall of said hopper and extending into said outlet beneath said impeller, and another vane hingedly mounted on said vent tube.

ELIAS GEORGE MUNDY.